US012716720B2

(12) United States Patent
Stafford et al.

(10) Patent No.: US 12,716,720 B2
(45) Date of Patent: Aug. 25, 2026

(54) DOCK AND CHANNEL MANAGEMENT SYSTEM

(71) Applicant: T. Baker Smith, LLC, Houma, LA (US)

(72) Inventors: Jean-Paul Stafford, Lafayette, LA (US); James N. Naismith, Ingleside, TX (US)

(73) Assignee: T. BAKER SMITH, LLC, Houma, LA (US)

( * ) Notice: Subject to any disclaimer, the term of this patent is extended or adjusted under 35 U.S.C. 154(b) by 335 days.

(21) Appl. No.: 18/691,555

(22) PCT Filed: Sep. 14, 2022

(86) PCT No.: PCT/US2022/043412
§ 371 (c)(1),
(2) Date: Mar. 13, 2024

(87) PCT Pub. No.: WO2023/043758
PCT Pub. Date: Mar. 23, 2023

(65) Prior Publication Data

US 2024/0401947 A1 Dec. 5, 2024

Related U.S. Application Data

(60) Provisional application No. 63/243,791, filed on Sep. 14, 2021.

(51) Int. Cl.

| | |
|---|---|
| ***G02C 13/00*** | (2006.01) |
| ***G01C 13/00*** | (2006.01) |
| ***G06F 16/29*** | (2019.01) |
| ***G08G 3/02*** | (2006.01) |

(52) U.S. Cl.
CPC .......... *G01C 13/008* (2013.01); *G06F 16/29* (2019.01); *G08G 3/02* (2013.01)

(58) Field of Classification Search
CPC ....... G01C 13/00; G01C 13/008; G06F 16/29; G08G 3/02
USPC .......................................................... 703/21
See application file for complete search history.

(56) References Cited

U.S. PATENT DOCUMENTS 11,691,703 B2 * 7/2023 Grunewald Mayer ..................... B63B 79/40 701/21
12,339,357 B2 * 6/2025 Seifert .................... G01S 15/89
2006/0122794 A1 * 6/2006 Sprague ................. G06Q 50/26 702/32

(Continued)

*Primary Examiner* — Andrew Joseph Rudy
(74) *Attorney, Agent, or Firm* — LAW OFFICE OF JESSE D. LAMBERT, LLC

(57) ABSTRACT

A Geographic Information System (GIS) with a digital process and database receives survey quality data, including but not limited to water depth information and location information, at multiple locations within an area of interest. The GIS processes that information and is operatively coupled to a user interface, namely a video screen device, to present the water depth and location information in color scale format. With entry of vessel information, including length, width, and keel depth, the system enables a user to determine whether sufficient water depth exists for the vessel to move to a desired position within an area of interest, for example a berthing area proximal a dock, or to carry out other marine operations.

7 Claims, 13 Drawing Sheets

(56) References Cited

U.S. PATENT DOCUMENTS

2011/0131050 A1* 6/2011 Zimmer ................. G06Q 10/08
705/1.1
2015/0149081 A1* 5/2015 Kramer, Jr. .......... G01C 21/005
701/450

* cited by examiner

DOCK AND CHANNEL MANAGEMENT SYSTEM

CROSS REFERENCE TO RELATED APPLICATIONS

This United States non-provisional patent application claims priority to U.S. provisional application Ser. No. 63/243,791, filed Sep. 14, 2021 for all purposes. The disclosure of that provisional patent application is incorporated herein by reference, to the extent not inconsistent with this disclosure.

BACKGROUND

Field of the Invention

Increased worldwide trade has led to larger vessels and increased vessel traffic in ports and similar vessel handling areas. Maintaining areas around docks, channels and the like to assure adequate vessel under-keel clearance, namely adequate water depth, is a challenge but is necessary for safe and efficient operations. As can be readily understood, the water bottom contour/water depth is not visible from above the water's surface. Communication of existing conditions, changes, and forecast of future conditions is critical to an effective operations and maintenance plan. The existing technologies provide a process that is slow and requires work by technicians or a third party to produce maps, charts, condition information, and forecast conditions.

SUMMARY OF THE INVENTION

The dock and channel management system embodying the principles of the present invention comprises a system, and method of use of a system, the system comprising a Geographic Information System (GIS) application comprising a digital processor and digital database, for storage of relevant water depth and other data, and use of those data to generate desired information.

In one embodiment, the system comprises a number of "dashboards," which permit data entry, quality control operations on the data, and data analysis.

The system further comprises a method, comprising the steps of providing a Geographic Information System (GIS) comprising a digital processor and database; collecting survey quality data, including but not limited to data comprising water depths at known locations within one or more areas of interest, under given tidal conditions, and storing the water depth data in the database; providing a visual user interface operatively connected to the GIS, and, using the survey quality data, generating one or more visual outputs comprising color scales corresponding to said water depths within the areas of interest, and displaying the visual outputs on the visual user interface, for viewing by a user; and determining, with the digital processor and use of the color scale water depth data, whether sufficient water depth exists in the areas of interest to carry out desired marine operations.

The method(s) may further comprise collecting survey quality data comprising dimensions and positional information for a dock, and storing the dimensions and positional information in the database; defining a slip area proximal the dock, the slip area comprising an area for berthing of a vessel, and being one of said one or more areas of interest, and storing survey quality positional information in connection with the slip area in the database; and entering information regarding a vessel into the database, the information comprising length and width of the vessel, and keel depth of the vessel under defined load conditions.

The method(s) may further comprise the steps of, for a given vessel, defining any areas within said one or more areas of interest having insufficient depth and/or width to permit passage of the vessel; with the digital processor, using the survey quality water depth information and the information regarding the vessel, determining a volume of dredge material which must be removed from a waterbottom in order to permit passage of said vessel within said area of interest; and collecting survey quality data related to available fill volume in connection with one or more upland areas adapted to receive dredge material, and comparing the available fill volume in such upland areas with the volume of dredge material to identify a suitable upland area for receipt of the dredge material.

DETAILED DESCRIPTION

Figure 1:
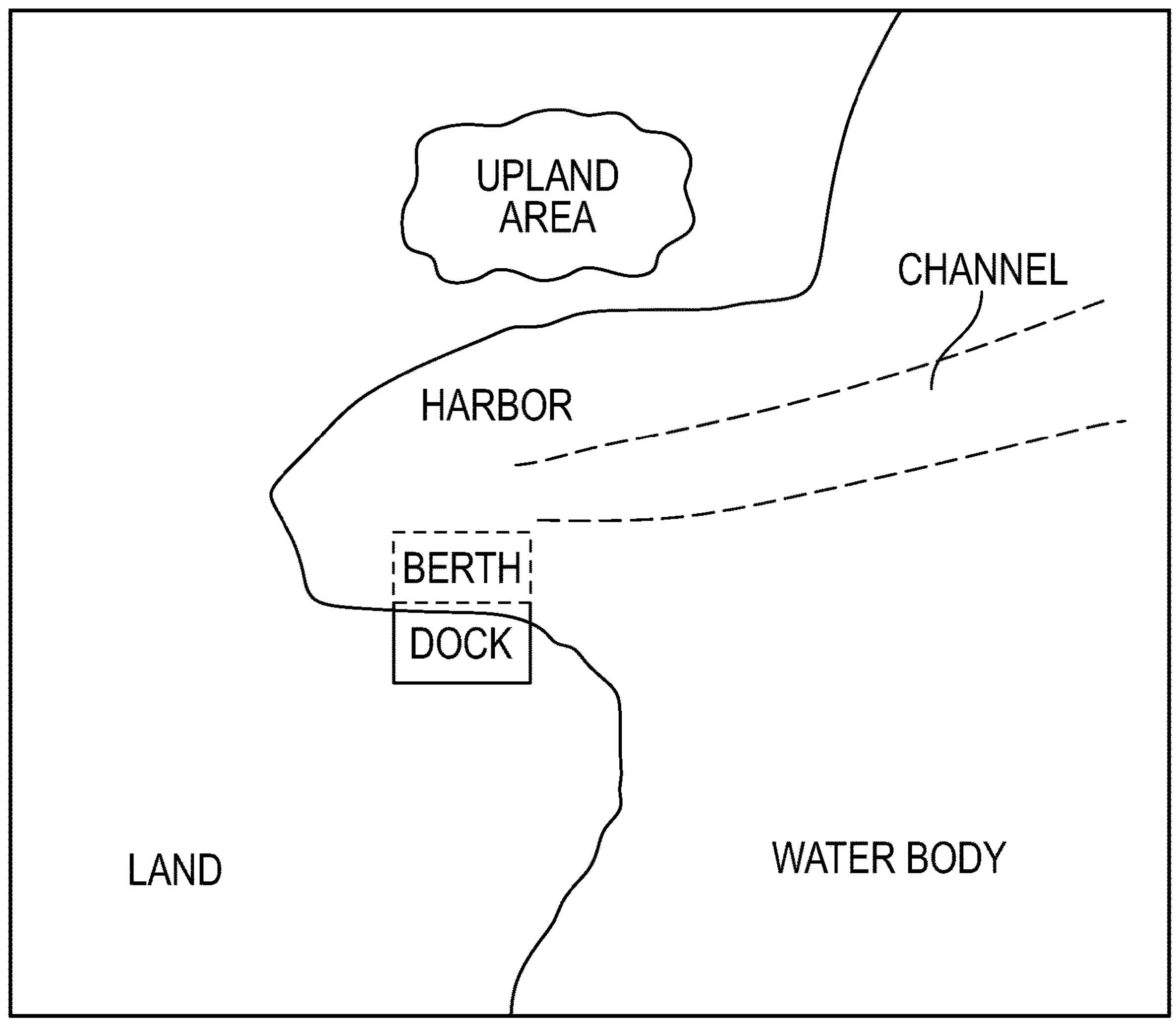
FIG. 1 is an illustration showing various exemplary areas of interest in a marine setting, in which marine operations may be carried out, including but not limited to channels, docks, berthing areas, and upland areas.
Figure 2:
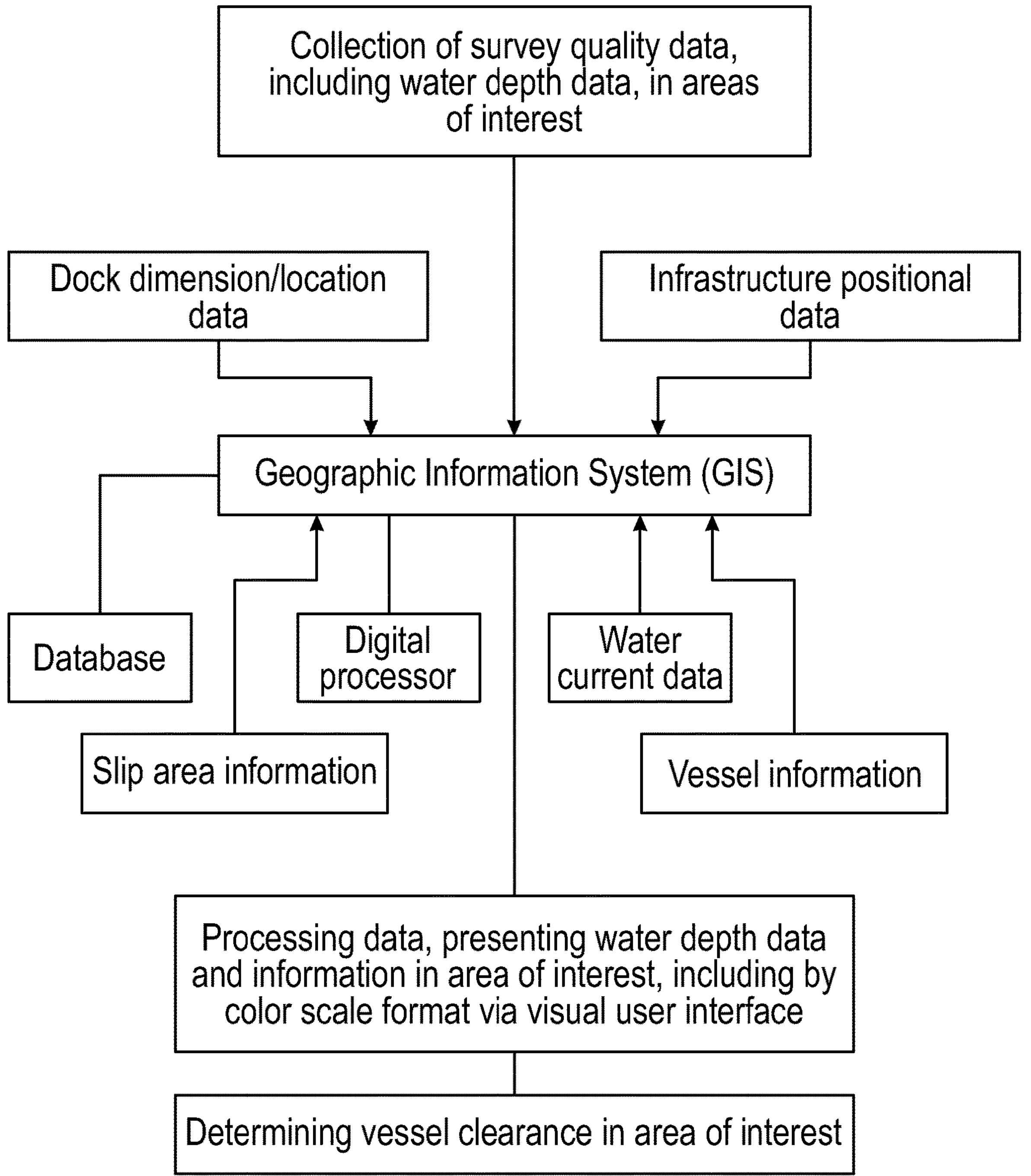
FIG. 2 is a diagram illustrating various steps of the method(s) embodying the principles of the present invention.
Figure 3:
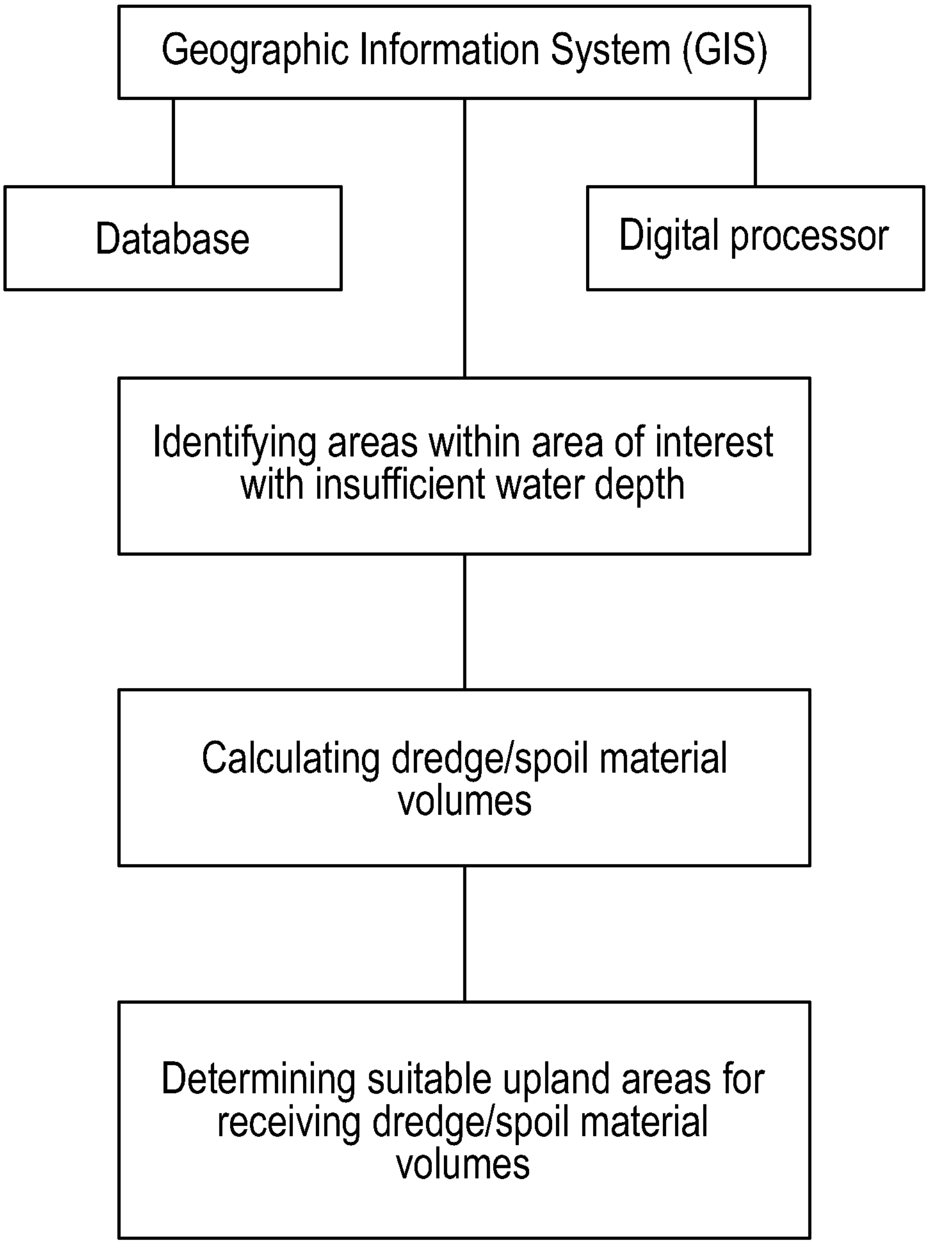
FIG. 3 is a diagram illustrating other steps of the method (s) embodying the principles of the present invention.
Figure 4:
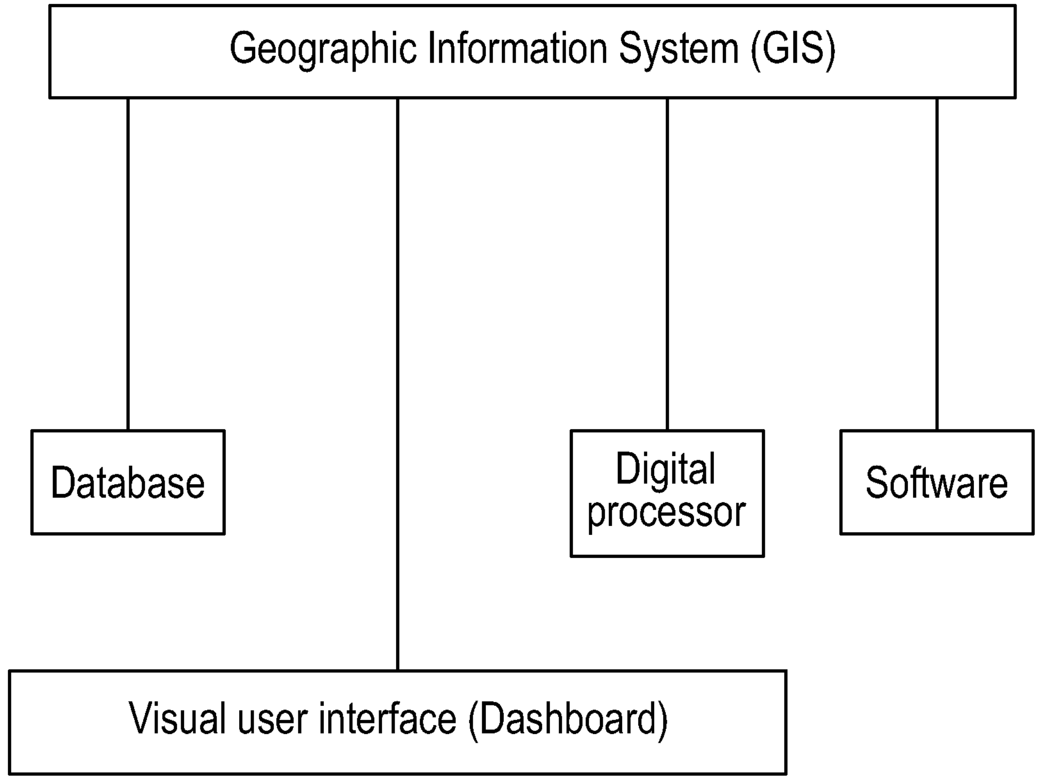
FIG. 4 is a diagram illustrating exemplary components of the system embodying the principles of the present invention.
Figure 5:
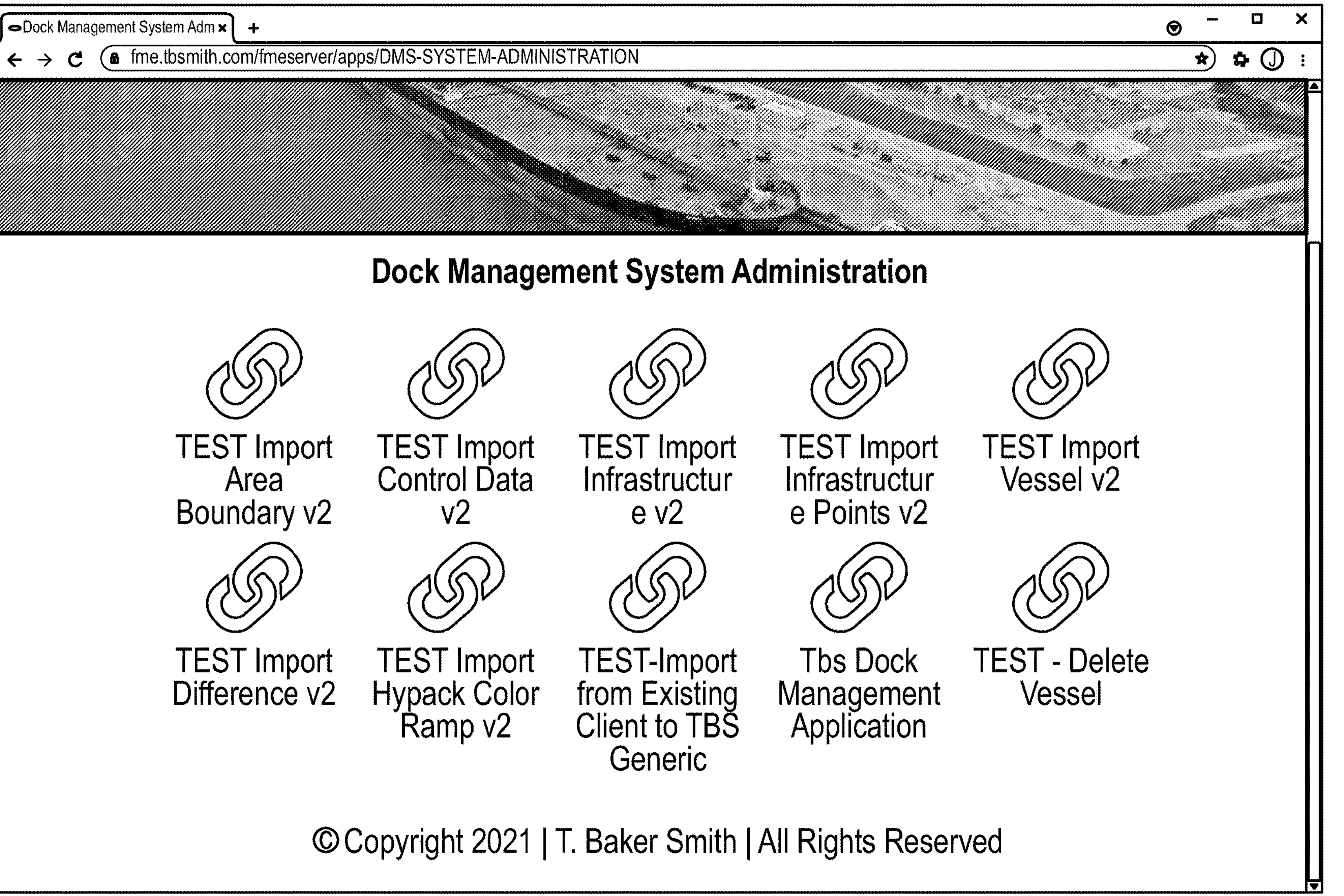
FIG. 5 shows is a dashboard or digital visual user interface of the system, embodying certain principles of the present invention.

The system embodying the principles of the present invention comprises a GIS application with a plurality of attributes, including but not limited to a plurality of "dashboards," namely pages in a visual user interface, which may comprise data entry/manipulation attributes. Various of the dashboards or visual user interfaces include, but are not limited to:

a Feature Manipulation Engine (FME) dashboard (FIG. 1) for loading data an internal Quality Control dashboard (FIG. 2), and a user dashboard (FIG. 3) for data analysis.

The system has a number of different measurement capabilities to enable a user to measure desired information on multiple areas of interest, as described in more detail below.

A point of distinction between the present invention, and known prior art systems and methods, is that the system and methods embodying the principles of the present invention use survey quality data related to water depths, and location or positional information for such depth measurements in all areas of interest, including but not limited to dock berthing areas, channels, or fairways. In addition, the location or positional information for other structures such as pipelines, buoys, and upland areas for possible placement of dredge material is all survey quality data.

For purposes of this patent application, "survey quality data" is data certified by a professional land surveyor in the relevant jurisdiction as accurate. Survey quality data may include water depths or any other type of data in an area of interest, at known locations and under known tidal conditions, as well as location information for any natural or manmade attribute or area of interest, which may be broadly referred to as infrastructure.

In connection with the present invention, areas of interest include but are not limited to the dock slip, defined as the area (generally adjacent or in close proximity to a dock or similar structure) in which a vessel can be berthed. This area is normally the same as the dredge area for maintenance dredging. Yet other areas of interest are channels, or more usually defining the area of interest as a section of channel. Other areas include fairways, which are areas surrounding docks and channels that may be accessed by support vessels. The various areas of interest are typically defined in the GIS system as simple closed polygons. Data defining the areas of interest are imported into the GIS database.

In addition, position and water depth information (XYZ) is imported into the GIS database. Water depth data may be collected with a multibeam echo sounder, for example deployed from a vessel, and processed to a suitable spacing, for example spacing of approximately six (6) feet. Water depth information is gathered at given tidal conditions, with both water depth and tidal conditions correlated. The position and depth information is imported and clipped or extrapolated to fill out an area of interest. Position and depth information, as survey quality data, comprises a key attribute of the method(s) and system of the present invention. Near real-time (quarterly or monthly) surveys, gathering survey quality data, are needed to ensure the results are valid and useful.

Positional information, as survey quality data, regarding infrastructure including but not limited to docks, wharves, mooring structures, pipelines, and other relevant structures, are entered into the database of the GIS, for example imported from drawing exchange format (DXF) files. Infrastructure control points can then be used to check or verify the location of the infrastructure.

Vessels may be represented in the visual user interface (dashboard) by a closed polygon or similar shape. Specific information/data about individual vessels (e.g., length, width, keel depth, etc.) is imported into the system and is then available to the GIS, for processing and output on a dashboard.

Color "ramps" or "color scales" are colors assigned to water depth ranges; that is, color gradations or scales provide a quick visual readout on water depths and similar sub-surface information. The color ramps or color scales may be in Hypack format (as noted below, by way of example from hydrographic software from HYPACK/Xylem, Inc., Middletown, CT), although it is understood that other commercially available or proprietary software and formats may be used. The color ramp or color scale tool in the GIS uses the imported color ramp or color scale and modifies colors to ranges as specified in the color ramp tool. In the attached Figures, it is understood that the color ramp or color scale is represented by gradations in black/white format.

Broadly, it is understood that the survey quality data collection and calculations thereon, by the GIS, and including but not limited to water depth data, can be used in connection with marine operations of any sort, including but not limited to vessel movement. "Marine operations" is thus used in a broad and inclusive sense in this application.

Use of Data; System Dashboard Tools/Applications

Figure 8:
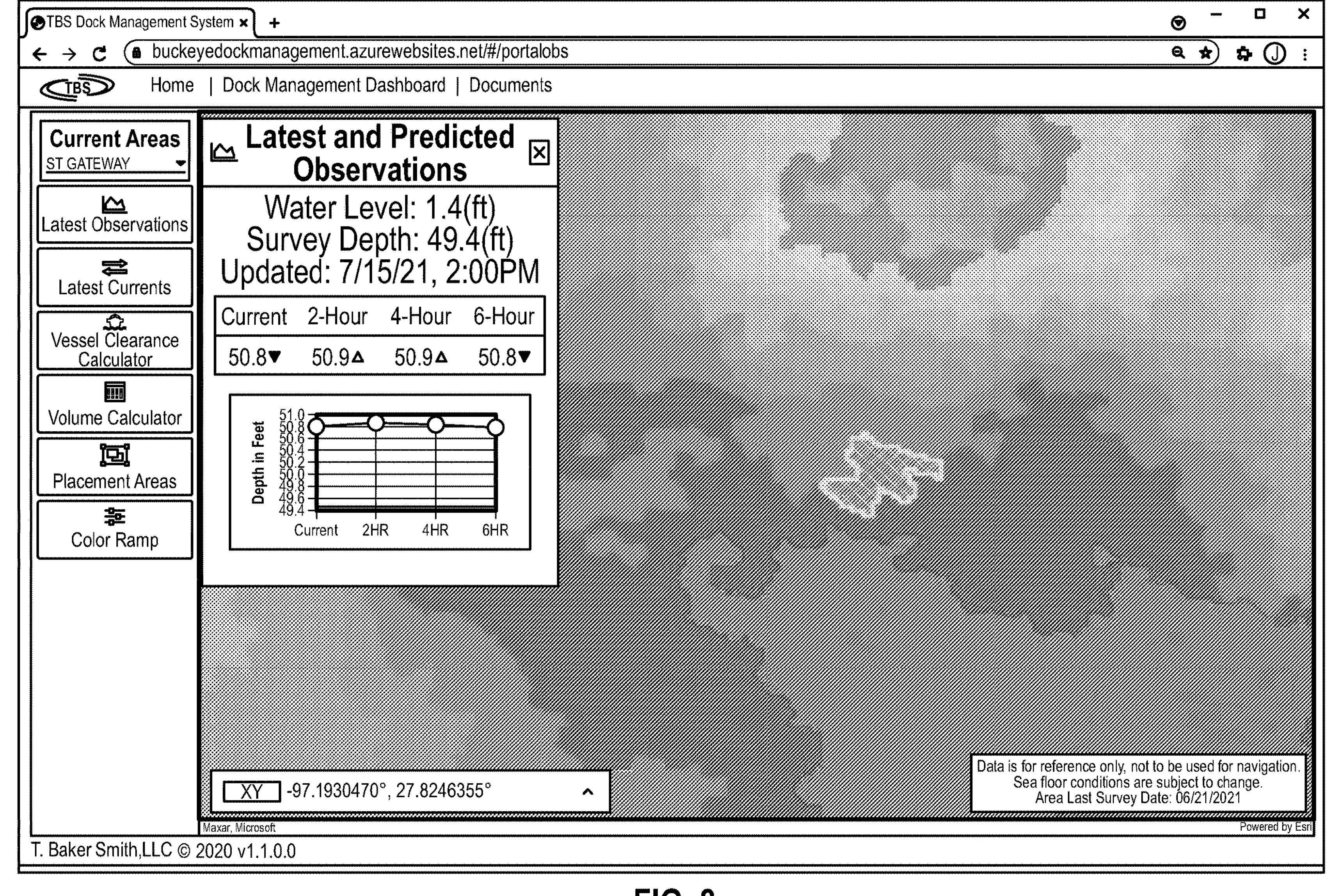
FIG. 8 is another dashboard (digital visual user interface) showing, via color gradation or color scale, water level/ water depth information at a given time, within an area of interest.

Once the survey quality data has been imported or entered into the GIS database, there are several tools or applications available on the dashboard(s) or visual user interfaces. By way of example and not limitation, such tools or applications may include:

"Latest Observations" (FIG. 8) is a tool to show the survey depth and the water depth at current and predicted water levels for a specific sub-area defined by a common depth.

Figure 9:
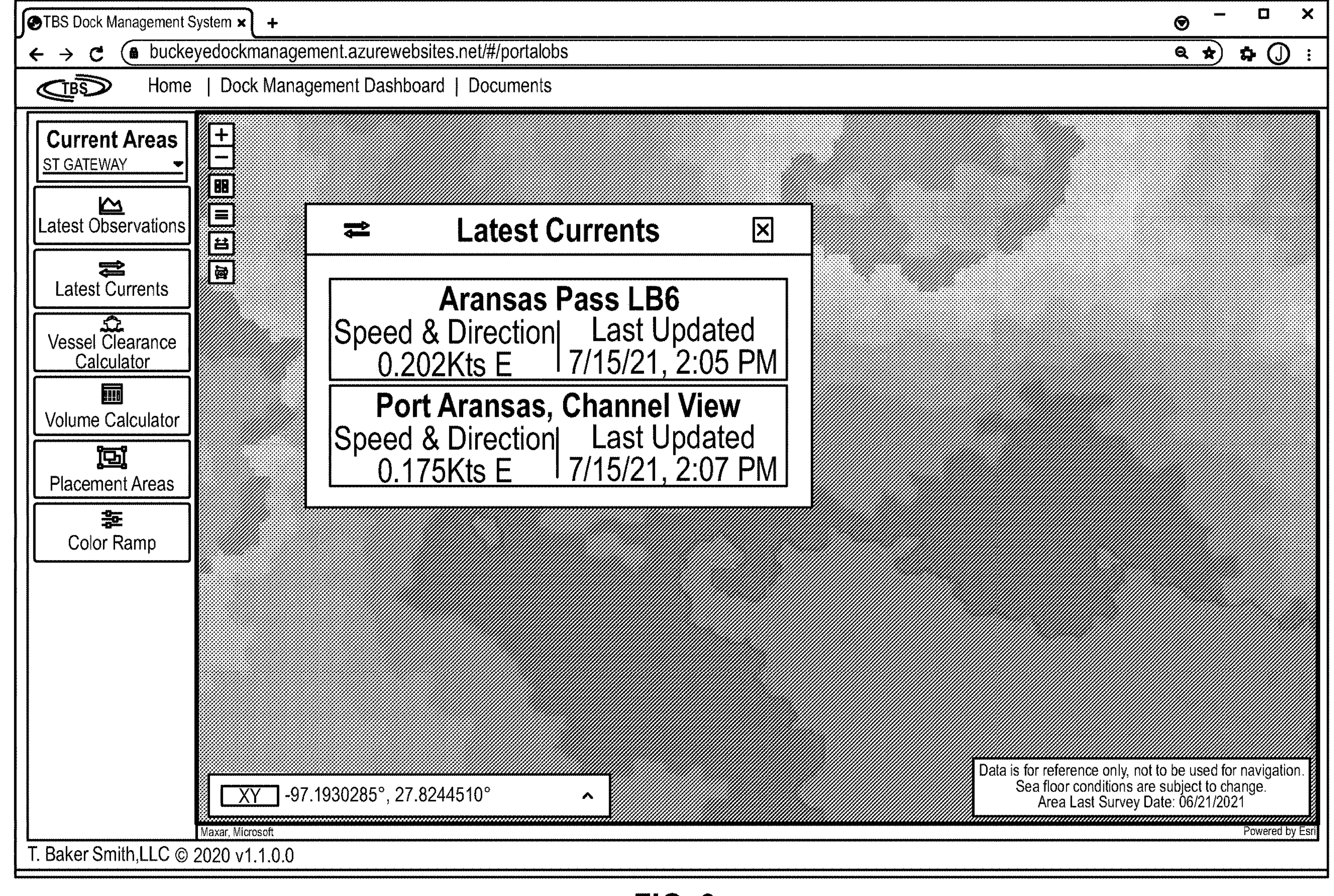
FIG. 9 is another dashboard (digital visual user interface) showing water current information at a given time, within an area of interest.

"Latest Currents" (FIG. 9) is a tool to show the local current meters with real-time current information.

Figure 10:
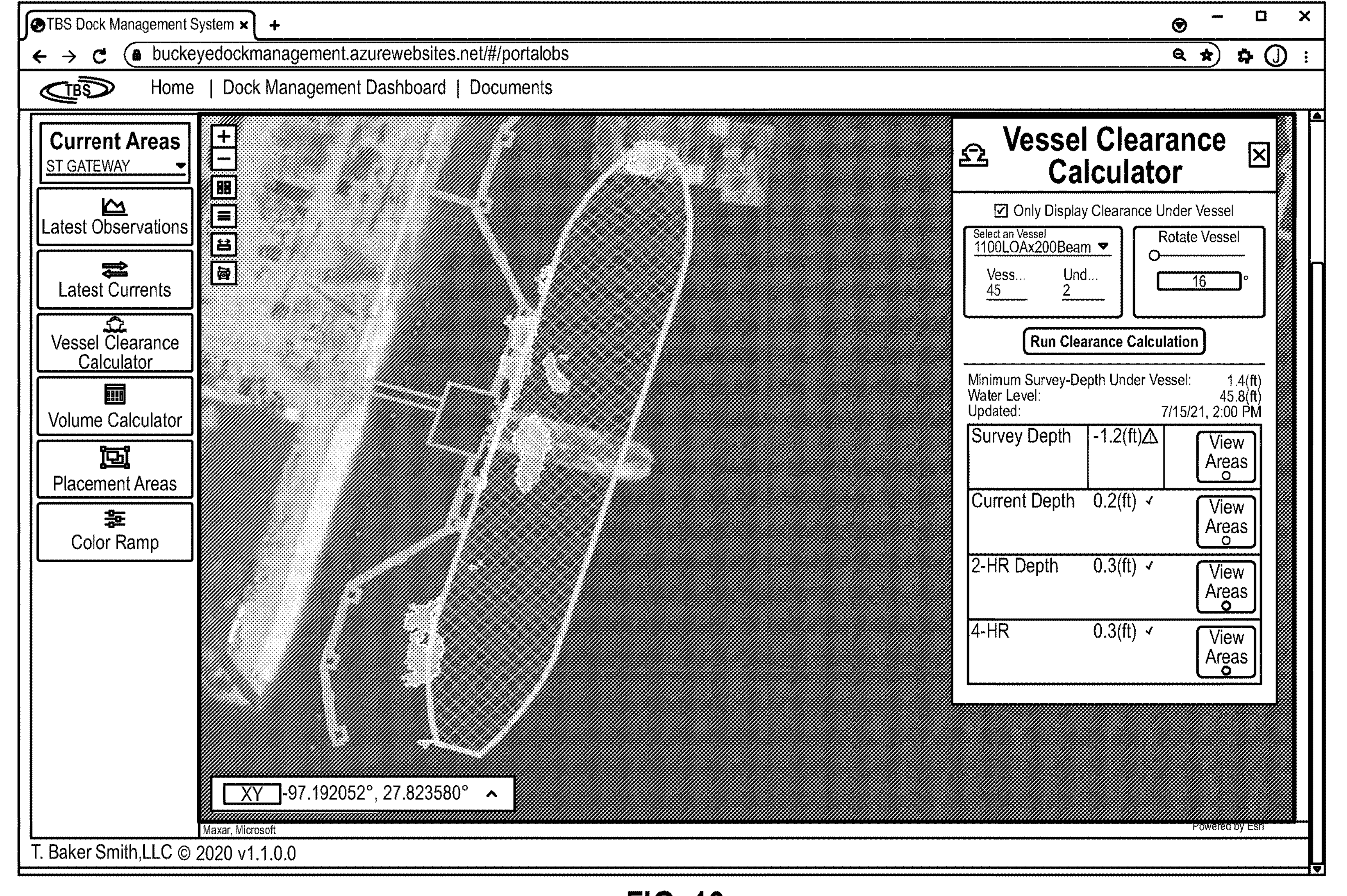
FIG. 10 is another dashboard (digital visual user interface) showing a model of a particular vessel positioned at a dock or berth, with water depth/bottom contour information also displayed.

"Vessel Clearance Calculator" (FIG. 10) is a tool that calculates and highlights under keel clearance for a vessel in a specified area within an area of interest.

Figure 11:
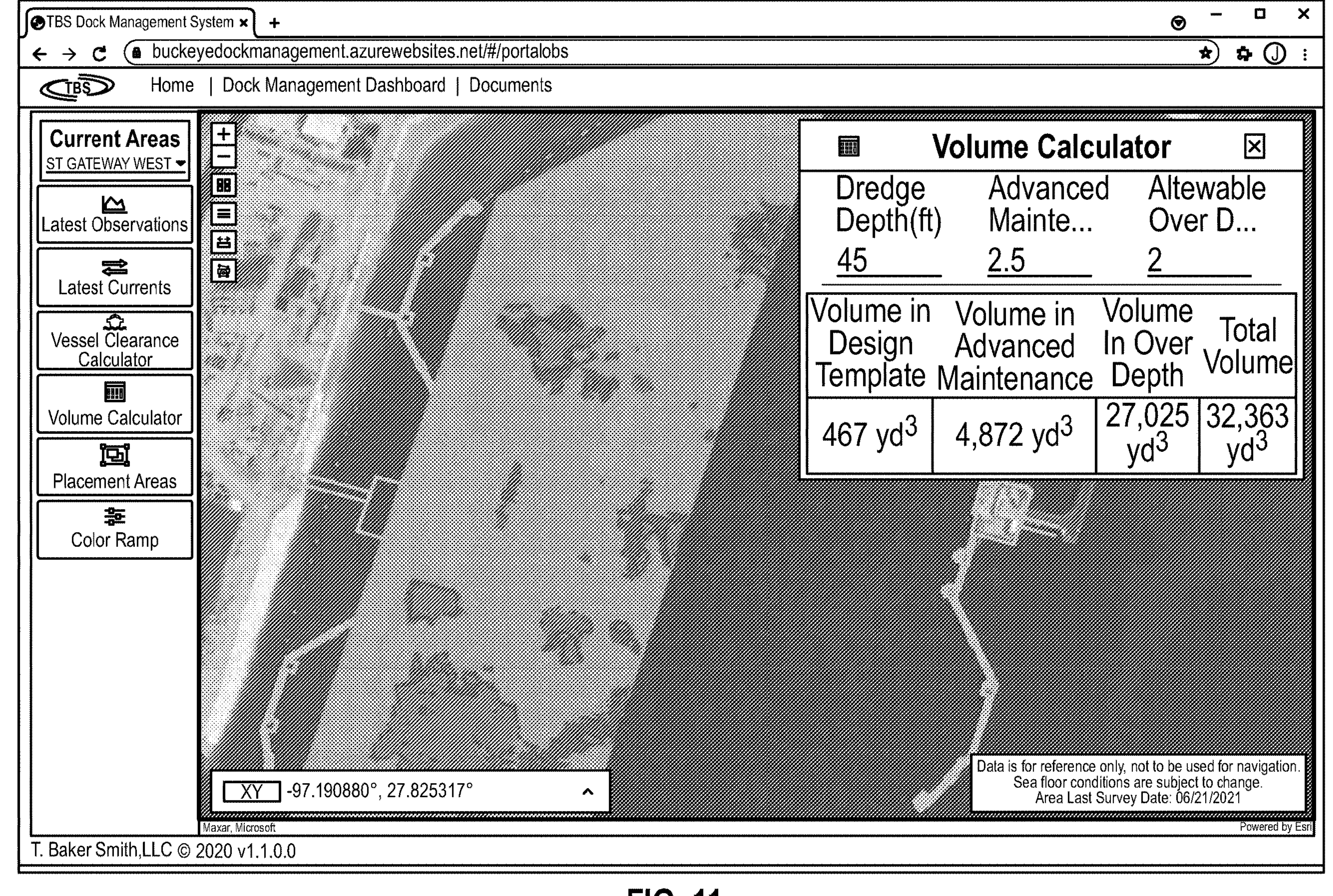
FIG. 11 is another dashboard (digital visual user interface) showing waterbottom fill or dredge volumes, namely an estimation of the volume of fill to be removed to accommodate a given vessel for passage through an area of interest.

"Volume Calculator" (FIG. 11) is a tool that calculates dredge or spoil volume to design dredge depth, advanced maintenance depth, and allowable overdepth. The volume is calculated in a specified area, usually the dredge area or channel section, but any other area may be specified.

Figure 12:
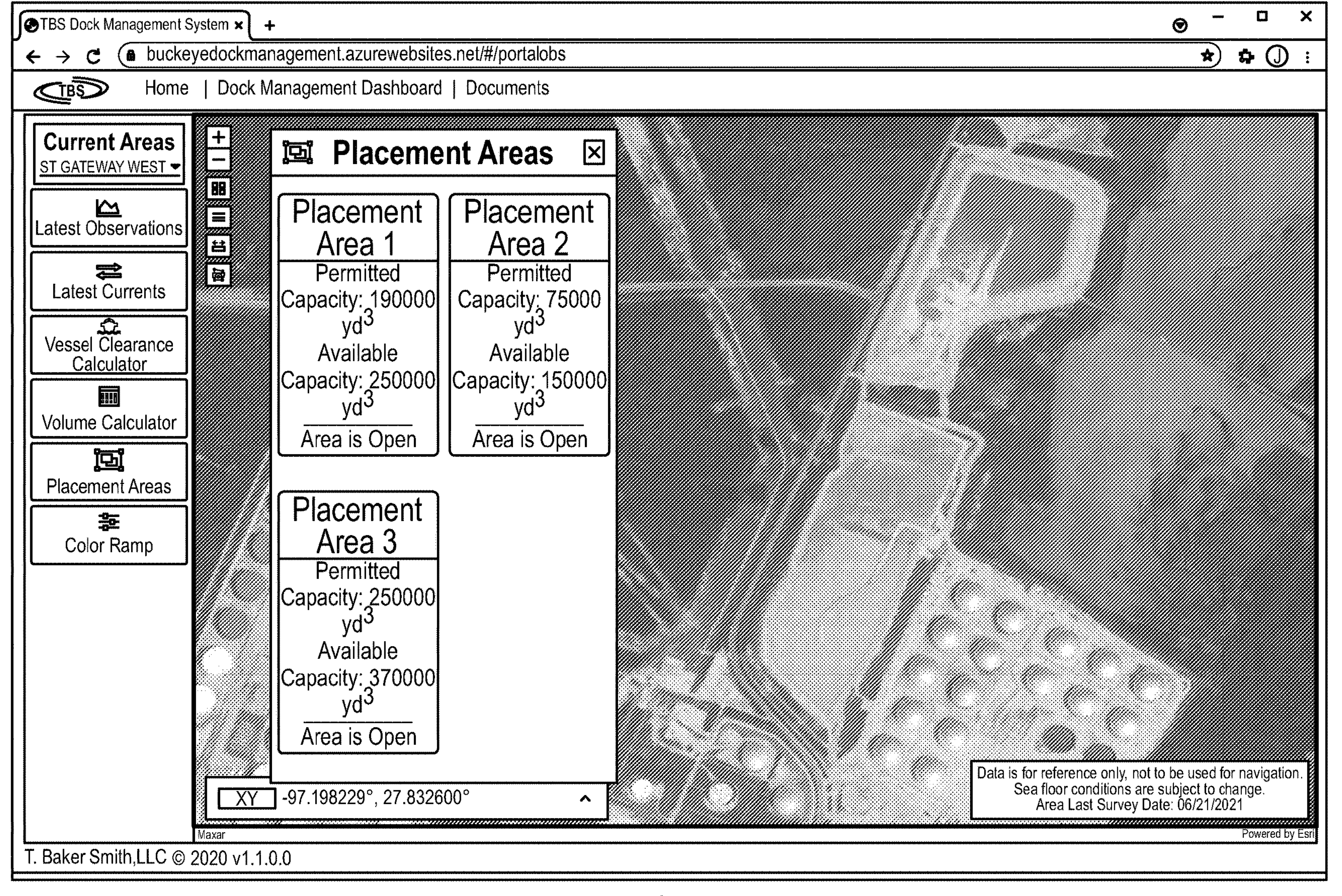
FIG. 12 is another dashboard (digital visual user interface) showing available placement areas, in upland areas, for waterbottom or dredge fill that has been removed from a waterbottom in an area of interest.

"Placement Areas" (FIG. 12) is a tool designed to provide similar volume calculations in an upland area for dredged material placement. As described further herein, the GIS is adapted to locate a suitable upland area to receive a given dredge or spoil volume.

Figure 13:
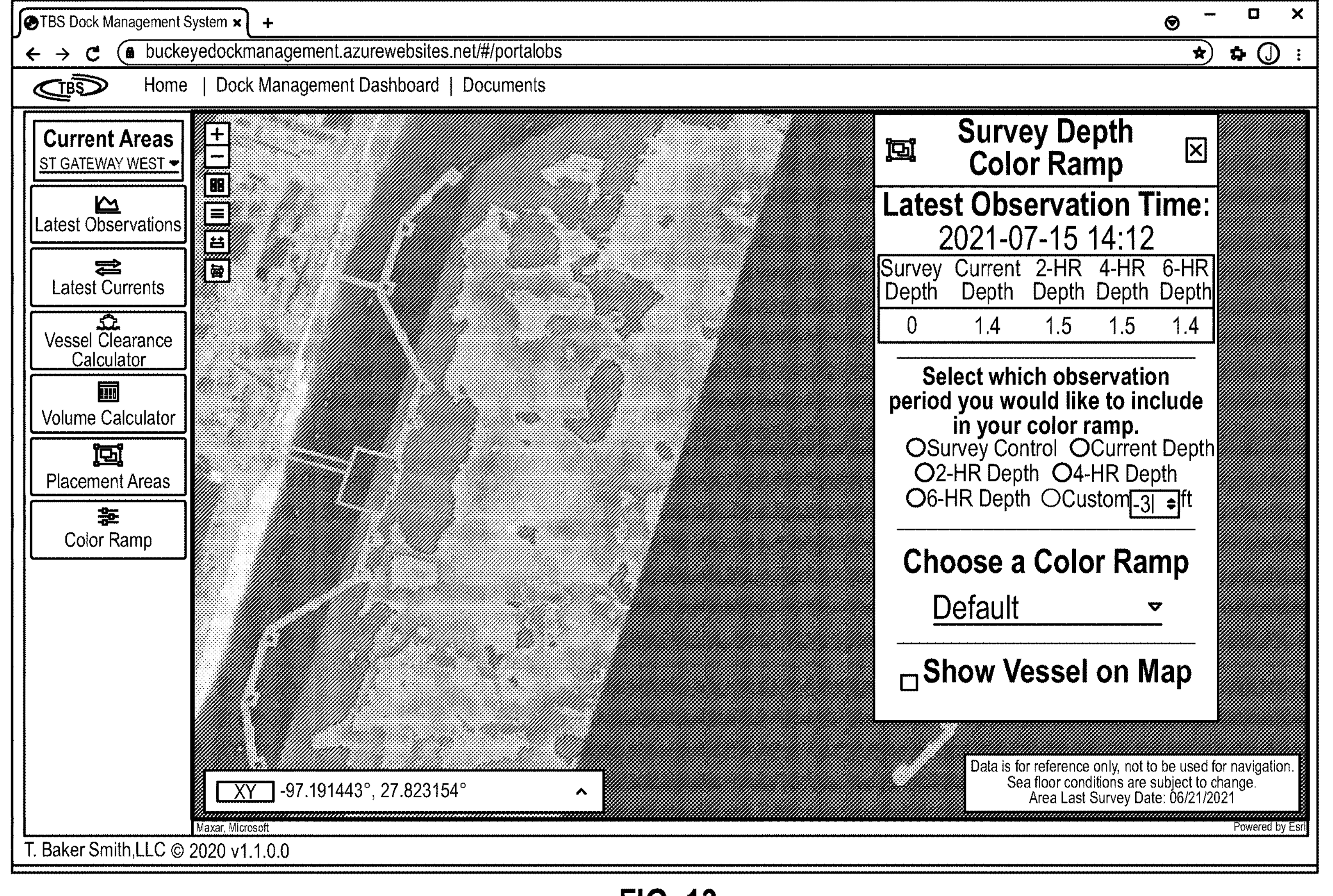
FIG. 13 is another dashboard (digital visual user interface) showing color gradation (color scale) for depth information.

"Color Ramp" (FIG. 13) is a tool that uses the base color ramp or color scale and modifies it to show depths relative to the current or predicted water level instead of survey depths. It can also modify the color ramp or color scale by a user entered value.

It is understood that the above-listed tools and the accompanying figures are by way of example only, and not limitation. It is further understood that one or more digital processors and software routines are used to make the requisite calculations, and to present the information in the dashboard format presented via a visual user interface.

APPLICATIONS AND EXAMPLES

Figure 6:
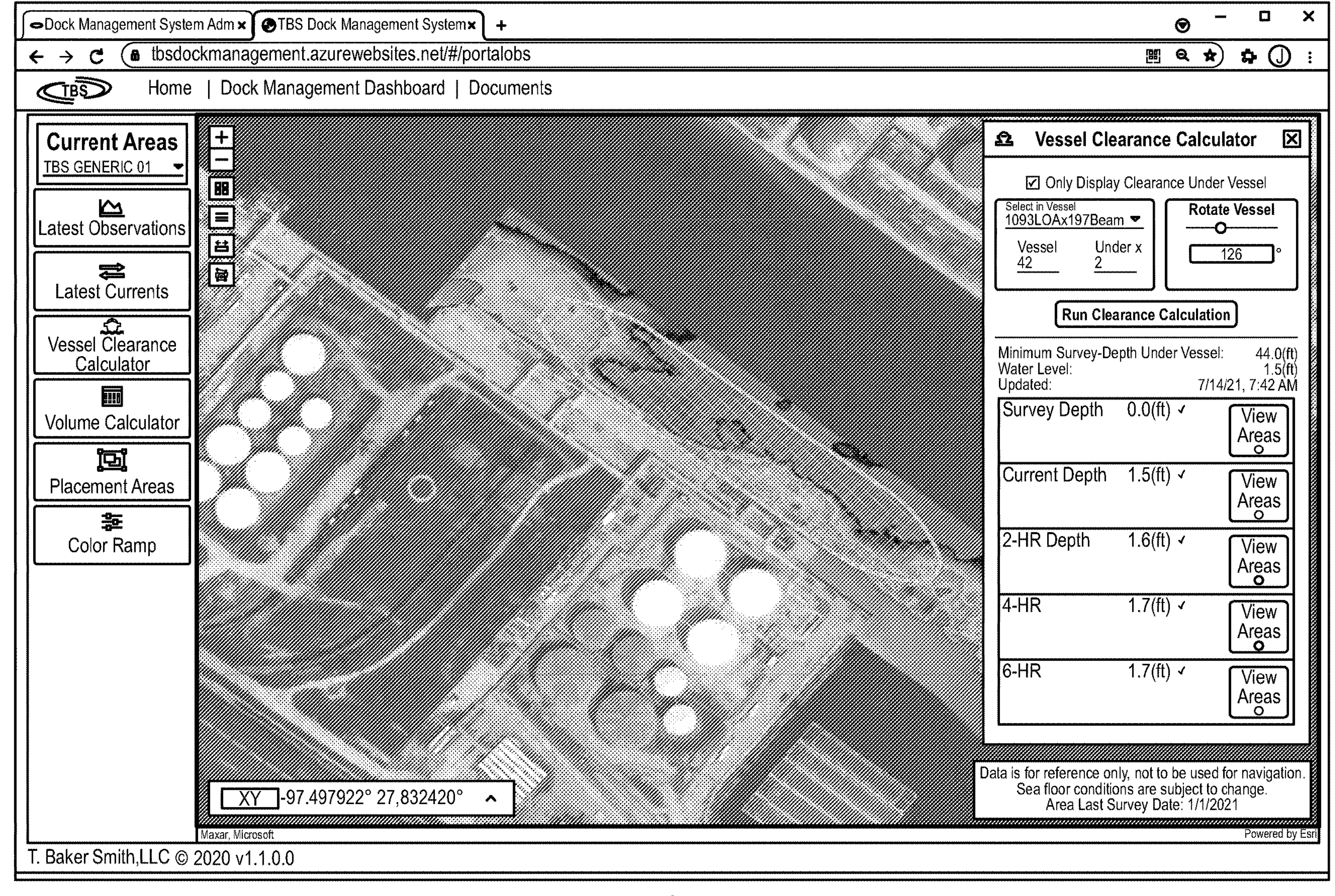
FIG. 6 shows a system dashboard (digital visual user interface) depicting various quality control attributes.
Figure 7:
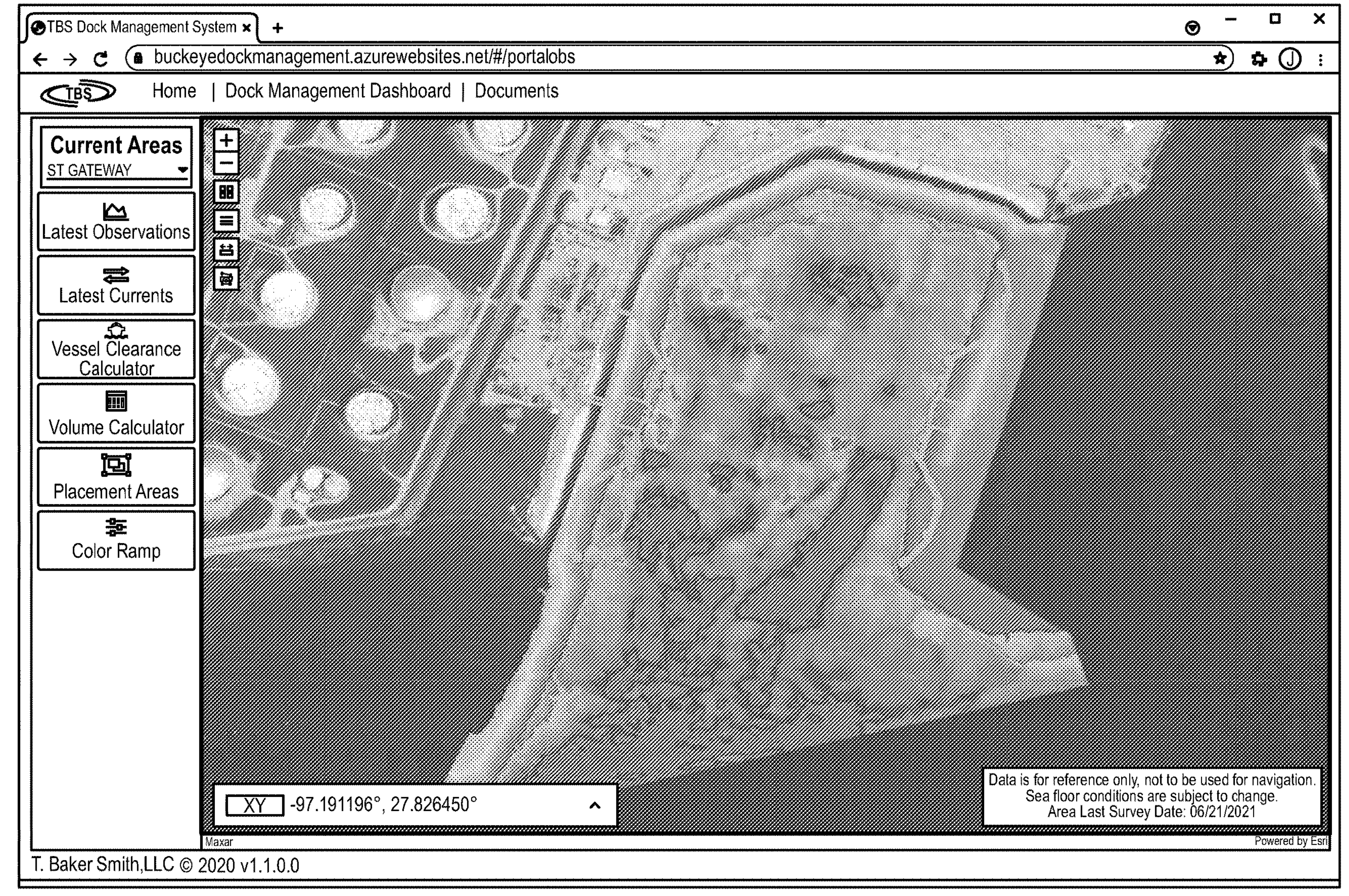
FIG. 7 is another dashboard (digital visual user interface) showing, via color gradation or color scale, water bottom contour/water depth information, at known locations within an area of interest.

As an example of use of one aspect of the system, the Vessel Clearance Calculator tool (see description and FIG. 6, above) is used to assist in berthing plans and loading/unloading of vessels. The calculator addresses the size of the berth (which is understood to be an area generally proximal a dock, at which a vessel is to be moored)—length, width, and minimum depth. The length and width of the berth may be variable depending on the value and location of minimum depth. The following examples further illustrate use of the system:

A client had three vessels scheduled for a berth that had shoaled in and needed dredging. The vessel clearance calculator tool, as part of the GIS, was used to determine minimum water depth at the berth, and if the vessel(s) could be berthed and/or would require Yokohama style fenders (to accommodate required standoff from the berth to the side of the vessel, so that the vessel would be at suitable water depths proximal the dock).

A vessel broker was working to determine the amount of additional cargo (resulting in increased vessel draft) that could be loaded if the vessel was spaced off of (that is, positioned away from) the usual mooring position. The calculator was used to determine the available spacing distance off of the usual mooring position and the increase in minimum depth at this distance. As is well known, a relatively small increase in vessel draft may enable significant load increases, hence increased revenue/profitability for a given vessel trip.

As an example of use of another aspect or utility of the system, the volume calculator (see description and FIG. 11, above) is used to estimate volume of dredge or spoil material that needs to be removed to bring the berth back to design depth. The following examples further illustrate use of the system:

A client is using the total volume (of material to be dredged, namely sediments building up in a location of interest) calculated at each quarterly survey to predict the dredge or spoil volume when future dredging is scheduled.

A client is using the estimated dredge or spoil volumes for fee negotiation with the dredging company.

Use of Digital Processor(s); Software

It is understood that the system embodying the principles of the present invention comprises one or more underlying digital processors and use of same, including the use of a plurality of computer routines to enable and/or facilitate the measurement of water depths and other data, and other attributes of the system. Certain of the computer routines may be developed as needed for specific applications. In addition, certain commercially available software may be used for certain aspects of the system, including but not limited to software available from:

Feature manipulation engine (FME) software from Safe Software, Vancouver, British Columbia, Canada hydrographic software from HYPACK/Xylem, Inc., Middletown, CT GIS and related software from Esri in Redlands, CA

CONCLUSION

While the preceding description contains many specificities, it is to be understood that same are presented only to describe some of the presently preferred embodiments of the invention, and not by way of limitation. Changes can be made to various aspects of the invention, without departing from the scope thereof.

Therefore, the scope of the invention is to be determined not by the illustrative examples set forth above, but by the appended claims and their legal equivalents.

We claim:

1. A method of managing water depth information in connection with vessel operations, comprising the steps of:

a. providing a Geographic Information System (GIS) comprising a digital processor and database;

b. collecting survey quality data comprising water depths at known locations within one or more areas of interest, under given tidal conditions, and storing said water depth data in said database, wherein said areas of interest comprise channels for passage of said vessel to a slip area;

c. collecting survey quality data comprising dimensions and positional information for a dock, and storing said dimension and location data in said database;

d. defining a said slip area proximal said dock, said slip area comprising an area for berthing of a vessel, said slip area being one of said one or more areas of interest, and storing survey quality data for positional information in connection with said slip area in said database;

e. providing a visual user interface operatively connected to said GIS, and using said survey quality data, generating one or more visual outputs comprising color scales corresponding to said water depths within said areas of interest, and displaying said visual outputs on said visual user interface;

f. entering information regarding a vessel into said database, said information comprising length and width of said vessel, and keel depth of said vessel under defined load conditions;

g. determining, with said digital processor and use of said color scale water depth data, whether sufficient water depth exists in said areas of interest to berth said vessel at a desired location relative to said dock;

h. for said vessel, defining any areas within said one or more areas of interest having insufficient depth and/or width to permit passage of said vessel; and i. with said digital processor, using said survey quality water depth information and said information regarding said vessel, determining a volume of dredge material which must be removed from a waterbottom in order to permit passage of said vessel within said area of interest.

2. The method of claim 1, further comprising survey quality data in connection with one or more upland areas adapted to receive dredge material, and comparing said one or more upland areas with said volume of dredge material to identify a suitable upland area for receipt of said dredge material.

3. The method of claim 1, wherein survey quality data comprises positional data for infrastructure.

4. The method of claim 3, wherein said infrastructure comprises at least one of: docks, wharves, mooring structures, or pipelines.

5. The method of claim 1, including the further step of collecting real time water current data within one or more areas of interest and entering same into said database.

6. A method, comprising the steps of:

a. providing a Geographic Information System (GIS) comprising a digital processor and database;

b. collecting survey quality data comprising water depths at known locations within one or more areas of interest, under given tidal conditions, and storing said water depth data in said database;

c. providing a visual user interface operatively connected to said GIS, and using said survey quality data, generating one or more visual outputs comprising color scales corresponding to said water depths within said areas of interest, and displaying said visual outputs on said visual user interface; and d. determining, with said digital processor and use of said color scale water depth data, whether sufficient water depth exists in said areas of interest to carry out desired marine operations;

e. collecting survey quality data comprising dimensions and positional information for a dock, and storing said dimensions and positional information in said database;

f. defining a slip area proximal said dock, said slip area comprising an area for berthing of a vessel, said slip area being one of said one or more areas of interest, and storing survey quality positional information in connection with said slip area in said database;

g. entering information regarding a vessel into said database, said information comprising length and width of said vessel, and keel depth of said vessel under defined load conditions;

h. for said vessel, defining any areas within said one or more areas of interest having insufficient depth and/or width to permit passage of said vessel therethrough;

i. with said digital processor, using said survey quality water depth information and said information regarding said vessel, determining a volume of dredge material which must be removed from a waterbottom in order to permit passage of said vessel within said area of interest; and i. collecting survey quality data related to available fill volume in connection with one or more upland areas adapted to receive dredge material, and comparing said available fill volume in said one or more upland areas with said volume of dredge material to identify a suitable upland area for receipt of said dredge material.

7. A system, comprising:

a Geographic Information System (GIS) comprising a digital processor comprising a memory, and a database, said digital processor adapted to receive survey quality data regarding water depths under given tidal conditions and within an area of interest, and location information regarding a dock;

one or more user interfaces operatively coupled to said GIS, and configured to receive survey quality data water depth data stored in said database, and display said survey quality water depth data in a color scale format, over one or more areas of interest;

said one or more user interfaces adapted to receive data regarding a vessel, said data comprising length, width, and keel depth of said vessel under given load conditions;

said digital processor adapted to process said survey quality water depth data and said data regarding said vessel, and determine whether sufficient under keel clearance exists for said vessel to move to a desired position within said area of interest, and wherein:

said digital processor is further adapted to process said survey quality water depth information and said data regarding said vessel, and in locations in which insufficient water depth exists to move said vessel to said desired position, to calculate a volume of dredge material to remove to permit said movement of said vessel; and said digital processor is further adapted to receive survey quality data regarding volumes available in upland areas for receipt of dredge material, and to determine the location of one or more upland areas with sufficient volume availability to receive said dredge material.

* * * * *